United States Patent Office 3,566,584
Patented Mar. 2, 1971

3,566,584
APPARATUS FOR CENTRIFUGAL AND GRAVITATIONAL SEPARATION OF LIQUID FROM GAS, PARTICULARLY WATER FROM STEAM
Klaus Ruthrof, Erlangen, and Erwin Kramer, Furth, Germany, assignors to Siemens Aktiengesellschaft, Berlin, Germany
Filed Nov. 12, 1968, Ser. No. 774,999
Claims priority, application Germany, Nov. 21, 1967,
P 15 76 878.2; Dec. 28, 1967, P 15 76 884.0
Int. Cl. B01d 45/12
U.S. Cl. 55—345                                     10 Claims

ABSTRACT OF THE DISCLOSURE

An apparatus for separating two-phase mixtures and preferably for separating water from steam at the end of the evaporator heating surfaces in a forced-flow boiler. The horizontally elongated vessel, such as the collector of the boiler system, is provided with rotationally symmetrical inserts which form respective separator chamber structures and are mutually spaced axially from each other so as to form gas chambers between each other. The two-phase mixture is tangentially supplied to each separator structure wherein it becomes centrifugally and gravitationally separated into steam and water. The steam passes through coaxial stub tubes in the axial ends of each separator chamber into the adjacent gas chambers, whereas the separated water drains through outlet openings. In one preferred form of the apparatus, the end covers of the individual separator chambers form partitions which transversely subdivide the interior of the collector vessel. In another form of the apparatus, the separator chambers are radially spaced from the interior wall surface of the collector vessel and radial partitions are mounted in the interspace so as to subdivide it into three plenum spaces for mixture, steam and water respectively. These plenum spaces communicate with the separator chambers, the gas chambers and the water outlets respectively, and the plenum spaces are also in communication with external conduits or pipelines for supplying the mixture and for withdrawing the steam and draining the water respectively.

---

Our invention relates to apparatus for separating the liquid and gaseous phases of mixtures such as water from steam and will be described hereinafter with preferential reference to the separation of water from steam in forced-flow or once-through steam generators. The invention is related to those disclosed and claimed in the copending applications of G. Blank et al., Ser. No. 774,989, filed Nov. 12, 1968, and Ser. No. 774,981, filed Nov. 12, 1968, these applications being assigned to the assignee of the present invention.

Apparatus for separating two-phase mixtures are particularly significant in steam generating plants, especially those of the forced-circulation or once-through type. During start-up or under low-load operation of such steam generators, relatively large quantities of water will occur in most cases immediately behind the evaporator heating surface. These quantities of water should not be permitted to enter into the following superheater surfaces or into the steam consuming equipment because of the trouble that may arise from the formation of water plugs. For that reason, care has been taken to provide a variety of watersteam separator vessels which eliminate the entrained water immediately behind the heating surfaces of the evaporator section in a boiler plant. Such devices, for example separator flasks, are excessively expensive and voluminous.

It is an object of our invention, therefore, to simplify the equipment needed for securing a reliable liquid-from-gas separation, especially for effecting a separation of water directly in the collector vessel which follows the evaporator heating surfaces. There are known collectors which also operate as separators. Such collectors, in most cases, are extensive in the vertical direction and are provided with various guide or baffle sheets to effect a centrifugal-force separation. This requires that the collector have a considerably larger height and size than otherwise needed so that no essential savings are afforded in comparison with the separately mounted separator flasks or the like devices.

It is a more specific object of our invention, therefore, to permit the use of conventional or already installed collectors and to afford the use of subsequently added inserts that are capable of securing the satisfactory separation of water from steam directly within the collector.

According to the invention, we provide the separator, or directly the collector vesels, with rotationally symmetrical separator chamber structures which have lateral end covers and have at least one tangential inlet for introducing the steam-water mixture. The covers at the axial ends of the separator chambers are traversed by coaxially aligned steam outlet tubes preferably in the form of short tube pieces or stub tubes, and the cylindrical jacket portion of the chamber structures is provided with openings at localities close to the axial end covers for the purpose of draining separated water from the separator chambers.

It will be noted that with such a design the elongated or horizontally extensive collector vessel is partitioned into separating chambers and intermediate gas collecting chambers. The water-steam mixture supplied to each separating chamber in a tangential direction and in about the middle of the chamber is first flung on helical paths to travel outwardly in both directions toward the axial end covers. This secures a reliable separation of the vaporous or gaseous phase from the liquid phase. The separated steam passes through the stub tubes coaxially inserted into the end covers, whereas the water drains off through the slots or gaps at the cylindrical wall portion of the separator chamber structures. According to another feature of our invention, the axial end covers of the respective separator chamber structures extend radially beyond the confines of the chamber structures proper so as to partition the interior of the collector vessel into steam spaces and water-containing spaces. With such a design of the apparatus, the openings in the separator chamber structures for the drainage of water are preferably designed as ring-shaped slots which extend over the entire periphery of the separating chamber. This reliably prevents the subsequent mixing of the separated water with the steam.

According to another feature of our invention, the annular space between the separating chamber structures and the inner wall surface of the collector vessel is subdivided by radial partitions into a water-carrying plenum space in the lower region of the collector, a steam-conducting plenum space in the upper region, and a plenum space for the supply of mixture, the latter space being located between the steam plenum and the water plenum spaces.

The separator chamber structures may be mounted in the axially elongated vessel in coaxial relation thereto, or they may be mounted in coaxial relation to each other but in spaced and parallel relation to the axis of the collector vessel.

A further object of our invention is to simplify the manufacture and installation of separating equipment according to the features set forth in the foregoing. To this end, and in accordance with a further feature of the invention, the end covers which aslo serve as transverse partitions in the collector vessel are so mounted together with the separator chamber structures and the water-containing chambers as to form a single subassembly together therewith. Such a subassembly is preferably mounted on a piece of tubular material having an outer diameter which matches the inner diameter of the collector vessel so that the entire tubular member with the parts mounted thereon can be shoved into the collector vessel as a single unit.

The supply of mixture to each individual separator chamber may be effected by means of a single conduit or duct which enters tangentially into the interior of the tubular structure. However, two or more such supply conduits may also be used. In the latter case it is preferable to have all of the supply conduits enter into the separator chamber on one and the same cross-sectional circle in angularly spaced relation to each other.

In this case the chamber structures may be given a largest diameter in the middle where the supply of mixture takes place, whereas the diameter of the separator chamber structure decreases from the middle toward the ends. As a matter of fact, the shape of the tubular structures need not necessarily be straight cylindrical but may be given any other rotationally symmetrical shape.

According to still another feature, it is of advantage to provide for a uniformly directed flow of gas from the individual separator chambers into the adjacent gas chambers. For this purpose, suitable guide means such as vanes may be mounted in the above-mentioned stub tubes.

When subdividing the collector into a chamber for the liquid phase and the gaseous phase respectively by providing radial partitions in the manner outlined above, it is further of advantage to insert pieces of tubular material between the individual separator chamber structures and in coaxial relation thereto. These interposed tubular members then serve as spacers between each two successive separator chamber structures and they should then be provided with one or more openings through which the gas plenum space communicates with the gas space surrounded by the inserted tubular member.

The above-mentioned and further objects, advantages and features of our invention, said features being set forth in the claims annexed hereto, will be apparent from, and will be described in, the following with reference to embodiments of separator apparatus according to the invention illustrated by way of example on the accompanying drawings in which:

The same reference numerals are employed in all of the illustrations for respectively corresponding items.

Figure 1:
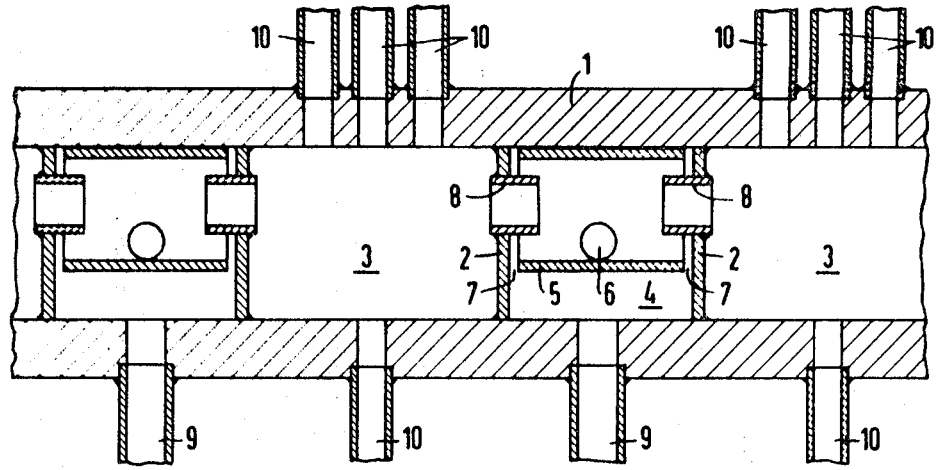
FIG. 1 shows schematically a portion of a collector with directly inserted partitions.

Referring to FIG. 1, there is shown a collector applicable at the end of the evaporator heating surface in a forced-flow boiler plant. The collector vessel 1 is shown to be subdivided in its interior by partitions 2 which are welded to the vessel 1 and provide a sequence of steam spaces 3 and water-containing spaces 4. Rotationally symmetrical separator structures 5, here shown to be substantially in the shape of straight cylindrical tubes, are inserted into the water-containing spaces 4 between respective partitions 2. The partitions 2 thus constitute end covers for the separating chambers within the structures 5. Mixture supply lines 6 enter tangentially into the tubular chamber structures 5 in order to supply the steam-water mixture. The chamber structures 5 are slightly shorter than the spacing between the adjacent covers or partitions 2 so that there remains an annular gap 7 between the axial ends of the separator chambers 5 and the partitions 2. The partitions 2, however, are interrupted by steam outlets 8 in the form of short stub tubes 8 which extend in coaxial relation to the tubular separator structures 5. Thus each gas space 3 communicates through the adjacent stub tubes 8 with the interior of the adjacent separator chambers 5.

When the steam-water mixture enters tangentially through the supply lines 6 into the separator chamber or structure 5, the mixture is first flung along the inner wall of the separator chamber so as to perform several rotations along this wall while flowing outwardly on helical paths in the directions toward the two adjacent covers or partitions 2. During this rotational travel of the mixture, the steam becomes separated from the water and passes through the stub tubes 8 into the adjacent gas spaces 3. The water is flung out of the separator chamber through the annular gaps 7 and is collected in the water chamber 4. The separated water then passes from chamber 4 through drain pipes 9 back into the circulation. The steam is drawn off from chambers 3 through steam pipes 10.

Figure 2:
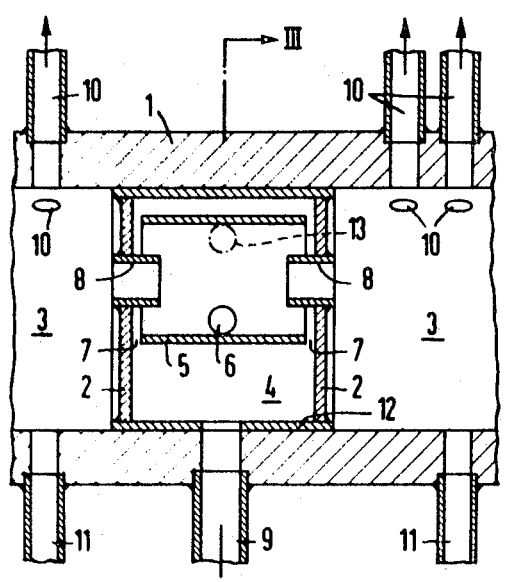
FIG. 2 shows in section another embodiment of a collector with a separator chamber structure and a water chamber designed as a partitioning unit which can be shoved into the collector vessel as a single unit.

When the throughput quantities are particularly slight or very high, it may happen that steam will escape through the annular gap 7 simultaneously with the water. It is advisable, therefore, to have the water conduits 9 first enter into a water-steam separating vessel which has a constant water level. The steam above this water level can then be recycled back into the steam-containing space 3 by means of a pipe 11 (FIG. 2) so that in this manner there is also achieved a pressure compensation with the water-containing chamber 4. Furthermore, any injection water which may enter through the stub tubes 8 into the steam spaces 3, may also drain off through the pipelines 11.

As a rule, there occurs a non-uniform distribution of the flung-out water along the inner wall of the separating chamber. In the region of the mixture supply conduits 6 a thicker layer of water will cover the wall of the separator chamber than in the vicinity of the annular gaps 7. For compensating this non-uniform distribution it is in some cases preferable to give the separating chamber structure such a rotationally symmetrical design that the diameter is a maximum in the middle, namely near the entering localities of the mixture, and to have the diameter decrease toward the axial ends. This will be more fully described hereinafter with reference to FIGS. 8 and 9. It should be recognized that it is not necessary to give the separating chamber a straight or cylindrical shape but that other shapes may be chosen as long as they remain rotationally cylindrical. Thus, the separating chamber may additionally be widened in the region where the mixture is tangentially supplied.

Figure 3:
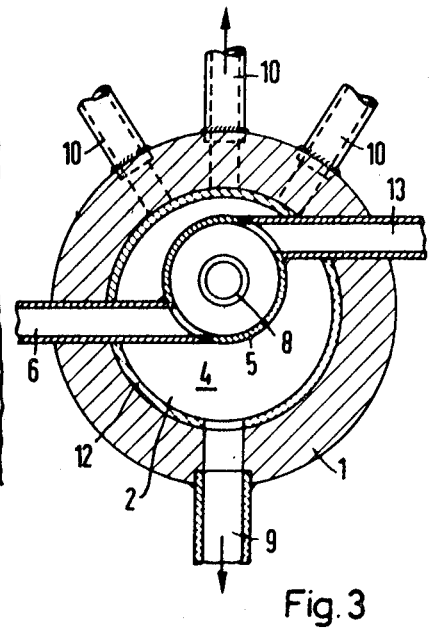
FIG. 3 is a cross section along the line III—III in FIG. 2.
Figure 4:
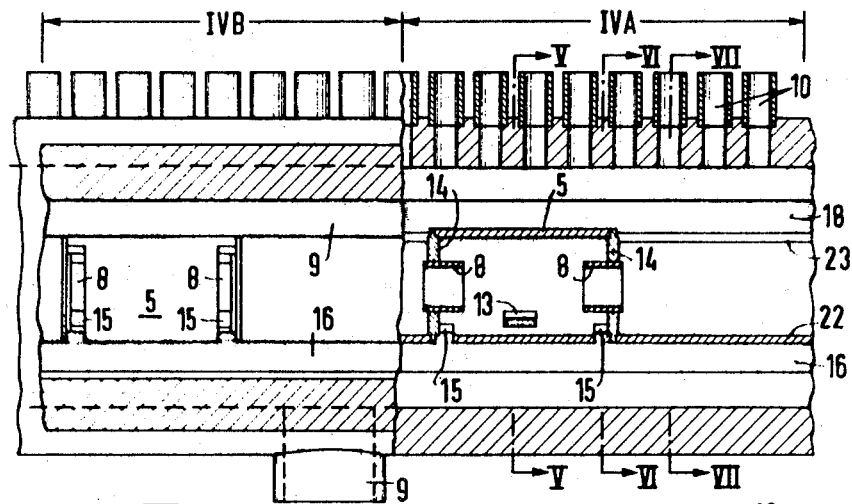
FIG. 4 is a schematic longitudinal section through a further embodiment of a collector in which plenum spaces are formed by radially extending partitions, the portions denoted in FIG. 4 by IVB and IVA showing vertical sections in respectively different planes as indicated in FIG. 5.
Figure 6:
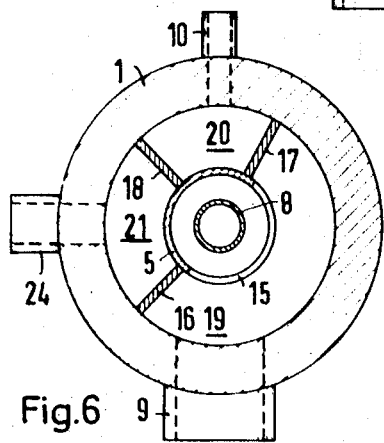
FIG. 6 is a cross section along the line VI—VI in FIG. 4.

When providing a plurality of mixture supply conduits such as those denoted by 6 and 13 in FIG. 3, it is preferable to have these enter into the separator chamber at one and the same cross-sectional circle of the chamber in order to thereby increase the resulting twist imparted to the mixture.

In cases where the throughout quantity is slight and the flow velocities in the separating chamber are also slight so that the resulting twisting motion and centrifugal forces in the separating chamber are likewise small, a separating effect is nevertheless produced by virtue of the fact that the separating chamber constitutes a sudden enlargement in cross section of the entering gas flow which is conducive to separation of water which then drains by gravity from the lower region of the separator chamber structure 5 through the annular slots 7.

A uniform passage of steam through the outlet conduits 10 can also be secured by mounting flow-guiding structures, such as guide vanes, in the stub tubes 8 thus securing a uniformly directed passage of gas through these tubes.

An essential advantage of separating steam-water mixtures or other two-phase mixture with the aid of apparaus according to the invention as exemplified above, resides in the fact that the axial flow components of the medium having the lower specific gravity is equal to the axial flow components of the medium having the higher specific gravity. This minimizes or prevents the interwhirling of the media as may occur in conventional cyclones due to entrainment of the heavier medium by the lighter medium. In addition, the annular gap 7 surrounding each stub tube 8 minimizes or prevents back-pressure formation of the separated water and thus contributes to achieving a better degree of separation.

With undivided and rather long collector vessels, the insertion of individual partitions and of the corresponding separator chamber structures may turn out to be difficult. For such cases, and in accordance with another feature of our invention, the water-containing chamber together with the partitions and the separator structures is combined in a subassembly and is shoved into the collector vessel as a single structural unit up to the proper locality where the mixture is to be supplied. The embodiment illustrated in FIGS. 2 and 3 incorporates the just-mentioned improvement features. The separating partitions 2 as well as the separator chamber structure 5 and a portion of the mixture supply conduits 6 and 13 are first firmly welded into a tubular member 12. This tubular member 12 encloses the water chamber 4 and can be shoved into the collector vessel 1 as a single and compact unit.

In apparatus according to the invention, the supply of the steam-water mixture can be effected from any desired side of the collector vessel. It will also be understood that the number of the outlet tubes for the separated water and for the steam is not limited to the number exemplified by the illustrations presented and described herein.

In the embodiment shown in FIGS. 4 to 7, rotationally symmetrical separator chamber structures 5 are coaxially aligned along the axis of the collector vessel 1. Each of the separator chambers has a tangential inlet 13 for the steam-water mixture and is limited by cover plates 14 which are coaxially traversed by stem outlet tubes 8 constituted by tubular stubs that protrude into the interior of the separator chamber. Drainage slots 15 for draining the separated water are provided in the jacket portion of the separator structure 5 in the vicinity of the end plates 14, this being particularly apparent from the longitudinal section IVB in FIG. 4 and from the cross section shown in FIG. 6. The annular interspace between the separator chamber structures and the inner wall surface of the collector 1 is subdivided by three radial partitions 16, 17 and 18 into three plenum spaces. The lowermost plenum space 19 serves as a manifold for passing the drained water to the water outlet conduits 9. The uppermost plenum space 20 within the vessel serves for connecting the steam chambers with the steam outlet pipes 10. The lateral plenum space 21, located between the plenum spaces 19 and 20, forms part of the conduit means for supplying the steam-water mixture through the respective inlets 13 into the separator chambers. The series of individual spaces for steam and water extends over the entire length of the collector vessel 1 so that, for example, the water-carrying plenum space 19 need be connected with but a small number of water outlet lines 9.

When the steam-water mixture enters through the lateral supply conduits 24 and through the plenum space 21 tangentially through the slot 13 into the separator chambers within the tubular structure 5, the mixture, assuming a suitable entering velocity will obtain, is first flung along and about the inner wall of the separator chamber where the mixture performs several rotations while traveling on a helical path outwardly in the direction toward each of the two end plates 14. During this rotation and helical travel of the mixture, the steam is separated from the water and leaves the separator chamber through the respective stub tubes 8, whereas the water enters into the annular space between each stub tube 8 and the cylindrical shell or jacket of the structure 5 where it leaves the structure through the slots 15 and passes into the plenum space 19.

Figure 7:
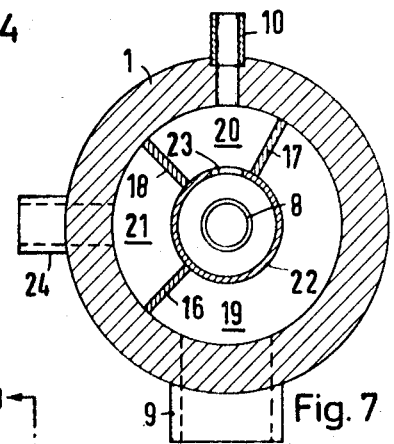
FIG. 7 is a cross section along the line VII—VII in FIG. 4.
Figure 5:
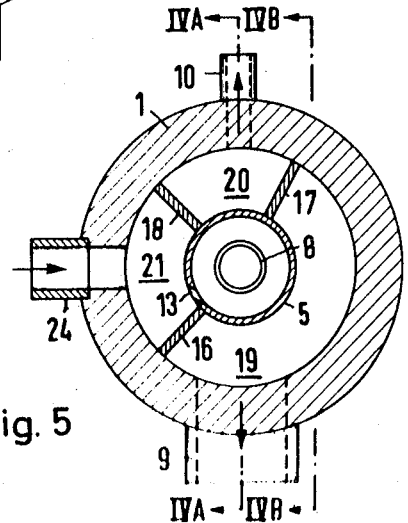
FIG. 5 is a cross section along the line V—V in FIG. 4.

As shown in the cross section according to FIG. 7, tubular pieces or members 22 are mounted between the individual separator chamber structures 5 so as to form a lining or jacket in the intermediate steam chamber 20. Each tubular member 22 has a longitudinal gap 23 at its top through which a steam chamber communicates with the steam plenum space 20 whence it passes through the steam lines 10 into the next following heating surfaces of the boiler.

In the event the throughput quantities and the flow velocities are slight, the twist imposed upon the mixture in each separating chamber is likewise slight so that the centrifugal separating action cannot be alone sufficient. However, each separating chamber in the apparatus according to the invention simultaneously operates as a gravitational separator because under the operating conditions just mentioned the water will simply drain from the bottom region of each separator chamber through the slots 15.

Figure 8:
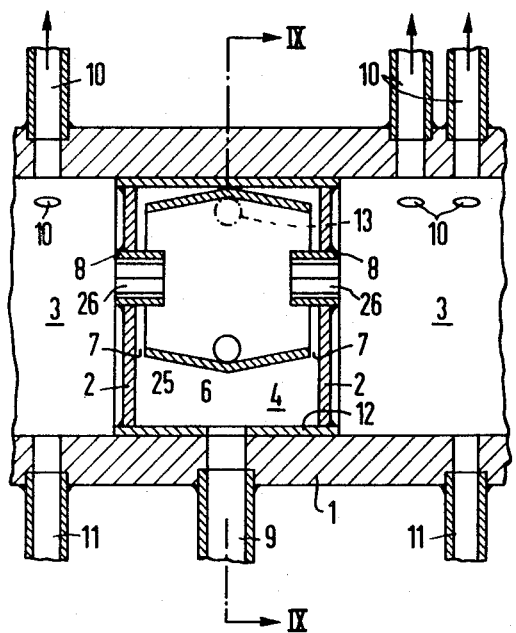
FIG. 8 illustrates in longitudinal sections still another embodiment of a separator device according to the invention which is equipped with a double-conical separator chamber.
Figure 9:
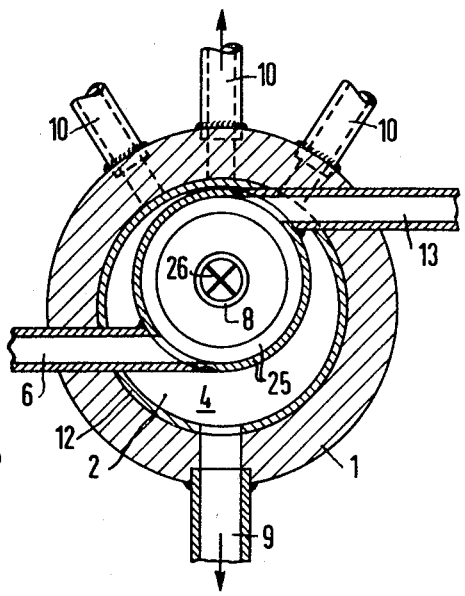
FIG. 9 is a cross section along the line IX—IX in FIG. 8.

As explained, the separated and flung-out water tends to be non-uniformly distributed axially along the inner wall of each separator chamber. The normal tendency of the apparatus is to form a thicker layer of water in the vicinity of the mixture inlet conduit 6 (FIGS. 1, 2) or 13 (FIGS. 4 to 7) than in the vicinity of the openings (7 or 15). It is preferable, therefore, to provide for compensation of such a non-uniform distribution. For this purpose, and as shown in FIGS. 8 and 9, the separating chamber structure 25 is given such a rotationally symmetrical shape that its inner diameter in the middle of the chamber, namely in the vicinity of the mixture supply conduits 6 and 13, is a maximum and decreases in both axial directions toward the respective stub tubes 8. If necessary, the double frusto-conical shaped chamber structure 25 can be given an additional outward bulge in the vicinity of the tangential mixture supply openings.

Furthermore, a more uniform flow of steam through the steam outlet pipes 10 is obtainable by providing the stub tubes 8 with flow directing inserts such as the guide vanes 26 shown in FIGS. 8 and 9. These have the effect of enforcing a uniform direction and greater uniformity in distribution of the steam flow leaving the separation chambers.

The embodiments described with reference to FIGS. 4 through 9 also afford the advantage that the axial flow component of the medium having the lower specific gravity has the same direction as the flow component of the heavier medium so that subsequent interwhirling and entrainment of the heavier medium by the lighter medium is prevented. The drainage gap surrounding the stub tubes entirely or partially also prevents the separated water from forming an appreciable amount of back pressure, thus securing a better degree of separation.

As explained, the invention also permits inserting the described separator devices into conventional collectors, including those that are already installed in steam generating plants. As a consequence, the water-steam separator vessels heretofore often needed behind the evaporator heating surfaces are no longer required or can be greatly reduced with respect to volume and space requirements. It is further not necessary in all cases to increase the volume of the collector equipped according to the invention but it rather suffices to retain conventional collectors and provide them with inserts for adaptation as required by the invention.

Separating collectors of the type exemplified by the embodiments illustrated and described herein are applicable not only for separating steam-water mixtures behind an evaporator, but they are likewise suitable for insertion at any other locality of a steam generating plant where a separation of steam and water is needed. This applies particularly to steam generators of nuclear power plants in which the steam generally exhibits a high degree of water content. Furthermore, such separators are generally applicable for the separation of two-substance mixtures into a liquid phase and a gaseous phase.

To those skilled in the art it will be obvious, therefore, that our invention permits of a great variety of modifications and uses and hence may be given embodiments other than particularly illustrated and described herein, without departing from the essential features of the invention as set forth in the claims annexed hereto.

We claim:

1. Apparatus for centrifugal and gravitational separation of a two-phase mixture into a gaseous and a liquid phase, comprising a horizontally elongated vessel, rotationally symmetrical separator chamber structures mounted within said vessel and mutually spaced axially so as to form gas chambers axially intermediate each of two of said separator chamber structures, mixture supply conduit means extending through the vessel wall communicating tangentially with each of said chamber structures and connected thereto, each of said structures having axial end covers and coaxial stub tubes centrally traversing said covers for passing separated gas from said chamber structures into said gas chambers, gas outlet means communicating with said gas chambers, each of said separator chamber structures having a peripheral wall provided with drainage openings near said covers, and liquid outlet means communicating with said openings from the outside of said vessel, said covers extending radially beyond said separator structures and forming transverse partitions in said vessel dividing the vessel into alternate gas receiving and separating chambers thus forming sequential sections of which each second one forms a liquid collecting space beneath said separator chamber structure, said openings and said liquid outlet means being in communication with said collecting space, and said drainage openings forming respective annular slots and extending over substantially the entire periphery of each of said separator chamber structures.

2. In apparatus according to claim 1, a gas plenum space in said vessel, a liquid plenum space in said vessel, said vessel being a collector for interposition between the evaporator and superheater of a forced-flow boiler, said gas outlet means comprising steam lines extending upwardly from said collector and communicating with said gas plenum space, and said liquid outlet means comprising water conduits extending downwardly from said vessel and communicating with said liquid plenum space.

3. In apparatus according to claim 1, said separator chamber structures being mounted in coaxial relation to said vessel.

4. In apparatus according to claim 1, said separator chamber structures being coaxially aligned with each other in a direction spaced from and parallel to the axis of said vessel.

5. Apparatus according to claim 1, comprising a tubular mounting member to which said separator chamber and said end covers are secured to form a structural subassembly together therewith, said tubular member being slidably seatable in said vessel to permit inserting said subassembly as a unit.

6. In apparatus according to claim 1, said mixture supply means for each of said separator chamber structures comprising a plurality of conduits tangentially entering into said chamber structure on the same cross-sectional circle of said structure.

7. In apparatus according to claim 1, said rotationally symmetrical separator chamber structures having a straight cylindrical interior shape.

8. In apparatus according to claim 1, said rotationally symmetrical separator chamber structures having a generally double frusto-conical shape so as to have different inner diameters along the axial length of each separator structure.

9. In apparatus according to claim 1, said rotationally symmetrical separator chamber structures having its largest diameter at the middle and having its diameters decreasing from the middle toward both axial ends.

10. Apparatus according to claim 1, comprising gas-flow guide means mounted inside said stub tubes for securing a uniformly directed gas flow.

References Cited

UNITED STATES PATENTS

| | | | |
|---|---|---|---|
| 373,374 | 11/1887 | Morse | 55—349 |
| 2,214,658 | 10/1940 | Browning | 55—459 |
| 2,439,850 | 4/1948 | Heller | 55—349 |
| 3,131,043 | 4/1964 | Burdock | 55—346 |
| 3,212,234 | 10/1965 | McMinn | 55—174 |
| 3,360,908 | 1/1968 | Baily | 55—347 |
| 3,415,374 | 12/1968 | Wikdahl | 55—349 |
| 3,435,598 | 4/1969 | Coulter | 122—488 |
| 3,440,806 | 4/1969 | Damratowski | 210—512 |

FOREIGN PATENTS

| | | | |
|---|---|---|---|
| 794,789 | 5/1958 | Great Britain | 209—144 |

FRANK W. LUTTER, Primary Examiner

B. NUZICK, Assistant Examiner

U.S. Cl. X.R.

55—416, 460; 122—488